(12) United States Patent
Boger et al.

(10) Patent No.: US 11,827,076 B2
(45) Date of Patent: Nov. 28, 2023

(54) REFRIGERANT SYSTEM WITH TWO INNER HEAT EXCHANGERS

(71) Applicant: Mahle International GmbH, Stuttgart (DE)

(72) Inventors: Markus Boger, Stuttgart (DE); Sascha Lindauer, Schorndorf (DE)

(73) Assignee: Mahle International GmbH

( * ) Notice: Subject to any disclaimer, the term of this patent is extended or adjusted under 35 U.S.C. 154(b) by 35 days.

(21) Appl. No.: 17/590,811

(22) Filed: Feb. 1, 2022

(65) Prior Publication Data

US 2022/0242197 A1 Aug. 4, 2022

(30) Foreign Application Priority Data

Feb. 2, 2021 (DE) .................. 102021200937.9

(51) Int. Cl.
*B60H 1/00* (2006.01)
*B60H 1/32* (2006.01)

(52) U.S. Cl.
CPC ..... *B60H 1/00907* (2013.01); *B60H 1/00278* (2013.01); *B60H 1/00921* (2013.01); *B60H 1/32281* (2019.05); *B60H 2001/00307* (2013.01); *B60H 2001/00928* (2013.01); *B60H 2001/00957* (2013.01)

(58) Field of Classification Search
CPC ............ B60H 1/00907; B60H 1/00278; B60H 1/00921; B60H 1/32281; B60H 2001/00307; B60H 2001/00928; B60H 2001/00957; B60H 1/3227; B60H 1/00007; B60H 1/3228
See application file for complete search history.

(56) References Cited

U.S. PATENT DOCUMENTS

| | | | | |
|---|---|---|---|---|
| 5,651,265 A | * | 7/1997 | Grenier | F25B 13/00 165/45 |
| 6,434,972 B1 | | 8/2002 | Geiger et al. | |
| 9,428,032 B2 | * | 8/2016 | Zhang | B60H 1/323 |
| 9,738,138 B2 | | 8/2017 | Rebinger et al. | |
| 10,358,015 B2 | * | 7/2019 | Hong | B60H 1/005 |

(Continued)

FOREIGN PATENT DOCUMENTS

| CN | 109383227 B | * | 7/2022 | ......... B60H 1/00271 |
|---|---|---|---|---|
| DE | 199 44 951 A1 | | 3/2001 | |

(Continued)

OTHER PUBLICATIONS

English abstract for DE-10 2011 016 613.

(Continued)

*Primary Examiner* — Ljiljana V. Ciric
(74) *Attorney, Agent, or Firm* — Fishman Stewart PLLC (57) ABSTRACT

An air conditioning system for a motor vehicle. The air conditioning system includes a refrigerant circuit divided into a high-pressure region and a low-pressure region, first and second internal heat exchangers arranged in the high-pressure and low-pressure regions, an external heat exchanger arranged in the refrigerant circuit, a condenser arranged in the high-pressure region, and an evaporator that, in a first operating mode, thermally couples the low-pressure region to the air conditioning air and, in a second operating mode, is arranged outside the refrigerant circuit.

20 Claims, 2 Drawing Sheets

(56) References Cited

U.S. PATENT DOCUMENTS

| | | | | |
|---|---|---|---|---|
| 10,473,374 | B2* | 11/2019 | Ohura | F25B 47/02 |
| 10,612,820 | B2* | 4/2020 | Takizawa | B60H 1/323 |
| 10,634,402 | B2* | 4/2020 | Kim | B60H 1/00385 |
| 11,130,385 | B2* | 9/2021 | Boger | B60H 1/3208 |
| 11,155,138 | B2* | 10/2021 | Kim | B60H 1/00007 |
| 11,186,137 | B2* | 11/2021 | Kim | B60H 1/32284 |
| 11,285,783 | B2* | 3/2022 | Sonnekalb | B60H 1/00385 |
| 11,292,313 | B2* | 4/2022 | Kim | B60H 1/00885 |
| 11,505,038 | B2* | 11/2022 | Kim | B60H 1/00899 |
| 2008/0085672 | A1* | 4/2008 | Creed | B60H 1/032 |
| | | | | 165/104.11 |
| 2010/0012295 | A1* | 1/2010 | Nemesh | H01M 10/6568 |
| | | | | 165/104.19 |
| 2014/0102126 | A1* | 4/2014 | Aoun | B60H 1/00328 |
| | | | | 62/244 |
| 2015/0273976 | A1* | 10/2015 | Enomoto | B60L 3/0046 |
| | | | | 62/243 |
| 2016/0107505 | A1* | 4/2016 | Johnston | B60H 1/00278 |
| | | | | 165/202 |
| 2016/0262419 | A1* | 9/2016 | Cowans | A23G 9/22 |
| 2017/0088006 | A1* | 3/2017 | Blatchley | B60H 1/323 |
| 2017/0174038 | A1* | 6/2017 | Scheldel | B60H 1/3213 |
| 2017/0253105 | A1* | 9/2017 | Allgaeuer | B60H 1/143 |
| 2017/0267066 | A1* | 9/2017 | Hong | B60H 1/32281 |
| 2019/0047363 | A1* | 2/2019 | Sonnekalb | B60H 1/00371 |
| 2020/0047591 | A1* | 2/2020 | He | B60H 1/32284 |
| 2020/0122544 | A1 | 4/2020 | Ishizeki | |
| 2022/0242197 | A1* | 8/2022 | Boger | B60H 1/32281 |

FOREIGN PATENT DOCUMENTS

| | | | | |
|---|---|---|---|---|
| DE | 10 2011 016 613 A1 | | 11/2011 | |
| DE | 102012208992 A1 | * | 12/2013 | ......... B60H 1/00899 |
| DE | 102013206630 A1 | * | 10/2014 | ......... B60H 1/00278 |
| DE | 102013227034 A1 | * | 6/2015 | ......... B60H 1/00278 |
| DE | 10 2014 003 908 A1 | | 9/2015 | |
| DE | 102016118688 A1 | * | 6/2017 | ......... B60H 1/00278 |
| DE | 102016110443 B4 | * | 3/2018 | ......... B60H 1/00914 |
| DE | 11 2018 002 070 T5 | | 12/2019 | |
| DE | 10 2018 215 026 A1 | | 3/2020 | |
| DE | 102019105035 A1 | * | 8/2020 | ......... B60H 1/00371 |
| DE | 102021104972 A1 | * | 9/2022 | |
| DE | 102021211987 A1 | * | 11/2022 | ......... B60H 1/00278 |
| DE | 102021121252 A1 | * | 2/2023 | |
| EP | 3444135 A1 | * | 2/2019 | ......... B60H 1/00271 |
| EP | 3444542 B1 | * | 7/2020 | ......... B60H 1/00278 |
| EP | 3 715 156 A1 | | 9/2020 | |
| EP | 3702181 A1 | * | 9/2020 | ......... B60H 1/00371 |
| EP | 4052938 A1 | * | 9/2022 | |
| FR | 2974624 A1 | * | 11/2012 | ......... B60H 1/00492 |
| WO | WO-2019158317 A1 | * | 8/2019 | ......... B60H 1/00007 |

OTHER PUBLICATIONS

English abstract for DE-10 2018 215 026.
German Search report for DE-102021200937.9, dated Oct. 13, 2021.
English abstract for EP-3 715 156.

* cited by examiner

Fig. 1

Fig. 2

REFRIGERANT SYSTEM WITH TWO INNER HEAT EXCHANGERS

CROSS-REFERENCE TO RELATED APPLICATION

This application claims priority to German Application No. DE 10 2021 200 937.9 filed Feb. 2, 2021, the contents of which are hereby incorporated by reference in its entirety.

TECHNICAL FIELD

The invention relates to an air conditioning system for a motor vehicle, which is operable in a first and in a second operating mode and is designed to be switchable between these two operating modes.

BACKGROUND

For some time now, motor vehicles have been equipped with air conditioning systems that have a refrigerant circuit in which a refrigerant circulates. As it circulates through the refrigerant circuit, the refrigerant undergoes a phase transition from liquid to gas and back again. Such an air conditioning system in a motor vehicle is usually used for air conditioning a vehicle interior, to which air conditioning air that can be conditioned by means of the air conditioning system can be supplied. Some conventional air conditioning systems allow the air conditioning air to be tempered—that is, cooled or heated—as well as dried or humidified. In the automotive sector, the air conditioning air can typically be exclusively dried. In this context, the efficiency of the air conditioning system is particularly important in terms of increasing the efficiency and reducing the consumption of a motor vehicle with such an air conditioning system, since the efficiency of the air conditioning system has a direct effect on the region of the motor vehicle. This is particularly important if the motor vehicle with air conditioning system is an electric motor vehicle. In particular, a heating energy requirement to be provided for a heating case in which the air conditioning air is heated by means of the air conditioning system must be taken into account with regard to the overall energy requirement of the motor vehicle, since this heating energy requirement can have a particularly strong influence on the overall energy requirement of the motor vehicle and thus its region.

For some time now, internal heat exchangers have been used to increase the efficiency of a refrigeration circuit in an air conditioning system for a motor vehicle—usually, however, only for pure cooling applications in which heating of the air conditioning air by means of the air conditioning system is not intended. Such an internal heat exchanger typically has a high-pressure side and a low-pressure side, wherein the high-pressure side is located in a high-pressure region of the refrigeration circuit and the low-pressure side is located in a low-pressure region of the refrigeration circuit. Here, the internal heat exchanger is used to transfer heat between the warm high-pressure region and the cool low-pressure region. A heat transfer in the internal heat exchanger is essentially dependent on a temperature difference between the warm high-pressure side and the cool low-pressure side and a mass flow of refrigerant passed through the internal heat exchanger. Usually, the internal heat exchanger is designed for cooling operation and the temperature differences and mass flows to be expected in this case, since, as already mentioned, use of the internal heat exchanger in heating operation is not usually intended.

In heating mode—which can also be referred to as heat pump mode and which is often not even provided for in conventional air conditioning systems with internal heat exchangers—operating conditions with significantly greater temperature differences and lower refrigerant mass flows can be expected compared to cooling mode, which can also be referred to as chiller mode. This leads in a disadvantageous way to the fact that in conventional air conditioning systems the internal heat exchanger designed for cooling operation would be significantly too powerful for heat pump operation and accordingly too much heat would be transferred from the warm to the cold side, which would have a detrimental effect on the efficiency and performance of the air conditioning system in heat pump operation. In addition, the design of the internal heat exchanger for cooling operation would restrict an operating region of the air conditioning system if a maximum permissible temperature in the refrigerant came within reach due to excessive heat transfer in heat pump operation associated with said design of the internal heat exchanger. Against this background, in conventional air conditioning systems the internal heat exchanger is often integrated in such a way that in heat pump operation refrigerant flows through it neither on its low-pressure side nor on its high-pressure side or exclusively on one of these two sides. Thus, in heat pump operation of conventional air conditioning systems, no heat transfer can take place in the internal heat exchanger. In other words, the internal heat exchanger in conventional air conditioning systems is therefore not used at all for heat pump operation, which proves to be less resource-efficient.

It is therefore an object of the present invention to show new ways for air conditioning systems for motor vehicles which in particular take account of the above problem.

This object is solved by the subject of the independent claim(s). Preferred embodiments are the subject of the dependent claims.

SUMMARY

Accordingly, the basic idea of the invention is to design an internal heat exchanger of an air conditioning system for a motor vehicle, which can be operated in a first and a second operating mode, of which the first can be a refrigerating machine mode and the second can be a heat pump mode, for heat pump operation and to use the internal heat exchanger in both operating modes—that is, in both heat pump mode and refrigerating machine mode—for heat transfer between a high-pressure region and a low-pressure region of a refrigeration circuit of the air conditioning system.

Advantageously, the internal heat exchanger can be used not only to operate the chiller—as is the case with conventional air conditioning systems—but also to operate the heat pump. The internal heat exchanger thus acquires additional functional content compared to a conventional air conditioning system.

The invention relates to an air conditioning system for a motor vehicle, which is operable in a first and a second operating mode. The air conditioning system is designed to be switchable between these two operating modes. The first operating mode may be a chiller or equivalent cooling operating mode and the second operating mode may be a heat pump or equivalent heating operating mode. Consequently, in the first operating mode, air conditioning air that can be conditioned by means of the air conditioning system can be cooled, and in the second operating mode, the air conditioning air can be heated. Preferably, the air conditioning air can be dried in one or both of the operating modes. Under certain circumstances, humidification of the air conditioning air can also take place in one or both operating modes. The motor vehicle may have a conventional internal combustion engine drive. The motor vehicle may be an at least partially electrified motor vehicle. The at least partially electrified motor vehicle can comprise an electrical energy storage device for storing electrical energy and an electrical drive for moving the motor vehicle, which drive can be supplied with electrical energy by means of the electrical energy storage device. The at least partially electrified motor vehicle can be a fully electric motor vehicle in which no other energy source is used in addition to electricity—in particular not for operating the air conditioning system.

It is understood that the air conditioning system according to the invention is operated as a heat pump in the thermodynamic sense both in heat pump mode and in chiller mode, with the heat sink and the heat source changing when switching between heat pump mode and chiller mode. The heat sink of the heat pump operation can therefore mutate into the heat source of the chiller operation when switching to the chiller operation. Similarly, when switching to chiller operation, the heat source of the heat pump operation can become the heat sink of the chiller operation.

The air conditioning system according to the invention comprises a refrigerant circuit in which a refrigerant can circulate and which is divided into a high-pressure region and a low-pressure region. In addition, the air conditioning system has a first internal heat exchanger arranged in the high-pressure and low-pressure regions and through which the refrigerant can flow, in which the high-pressure region is thermally coupled to the low-pressure region in order to transfer heat from the high-pressure region to the low-pressure region. The air conditioning system includes a second internal heat exchanger that is incorporated in the first operating mode for transferring heat from the high-pressure region to the low-pressure region in the low-pressure and high-pressure regions, and that thermally couples the high-pressure region to the low-pressure region. Furthermore, the air conditioning system comprises an external heat exchanger arranged in the refrigerant circuit and through which the refrigerant can flow, which thermally couples the refrigerant circuit to the outside air in order to transfer heat between the refrigerant circuit and an outside air. The air conditioning system further comprises a condenser arranged in the high-pressure region and through which the refrigerant can flow, which thermally couples the high-pressure region to the air conditioning air in order to transfer heat from the high-pressure region to air conditioning air that can be supplied to a vehicle interior to be air-conditioned. Refrigerant can flow through the first internal heat exchanger, the external heat exchanger and the condenser regardless of the operating condition—i.e. in both operating modes.

According to the invention, the air conditioning system further comprises an evaporator through which refrigerant can flow, wherein the evaporator is fluidically integrated into the low-pressure region of the refrigerant circuit in the first operating mode of the air conditioning system and is fluidically separated from the refrigerant circuit in the second operating mode. Thus, in the first operating mode of the refrigerant system, the evaporator may be located in the low-pressure region and may thermally couple the low-pressure region to the air conditioning air in the first operating mode to transfer heat from the air conditioning air to the low-pressure region. In this case, the evaporator can be arranged outside the refrigerant circuit in the second operating mode. In other words, the evaporator may be deactivated in the second operating mode and activated when switching from the second to the first operating mode. Conversely, the evaporator can be deactivated when switching the air conditioning system from the first operating mode to the second operating mode. In this case, the second internal heat exchanger is separated from the refrigerant circuit in the second operating mode.

As an advantage of the air conditioning system according to the invention, it results that the first internal heat exchanger can be used for heat transfer in both operating modes—i.e. in both chiller operation and heat pump operation. This means that the first internal heat exchanger, in contrast to conventional air conditioning systems with a single internal heat exchanger, is used for heat transfer in every operating mode of the air conditioning system according to the invention, which at the same time makes a special heat exchanger obsolete for the operating mode which cannot be realized in conventional air conditioning systems in each case by means of the single internal heat exchanger. At the same time, the air conditioning system according to the invention proves to be particularly energy-efficient in both operating modes.

According to a preferred further development of the air conditioning system, the same comprises an adjustable changeover device by means of which the evaporator can be connected to or disconnected from the refrigerant circuit for switching between the first and the second operating mode. This makes it possible to select the operating mode of the air conditioning system in a way that is particularly easy to implement from a technical point of view.

Expediently, the first internal heat exchanger is designed for the first operating mode and the second internal heat exchanger is designed for the second operating mode. An air conditioning system designed in this way can be operated particularly efficiently.

In a further advantageous development of the air conditioning system, the evaporator is arranged in an additional refrigerant line of the air conditioning system, which branches off from the refrigerant circuit in a branch upstream of the evaporator and opens out again into the refrigerant circuit downstream of the evaporator. Thus, the evaporator can be integrated into the refrigerant circuit or separated from the refrigerant circuit particularly well between the operating modes.

The changeover device conveniently comprises a changeover valve device adjustable between a closed position and an open position, which is arranged in the branch or in the additional refrigerant line, so that no refrigerant can flow through the evaporator in the closed state. In the second operating mode of the air conditioning system, the changeover valve device is in its closed position. Such a switching valve device responds particularly spontaneously to control signals for switching between the operating modes of the air conditioning system.

According to a further advantageous development of the air conditioning system, the same has a (first) expansion device arranged in the refrigerant circuit and through which the refrigerant can flow, which forms a (first) transition between the high-pressure and low-pressure regions. The (first) expansion device can be an expansion valve. In this case, the air conditioning system comprises a chiller through which the refrigerant can flow and which is arranged in the low-pressure region between the first internal heat exchanger and the (first) expansion device. The chiller is fluidically separated from the refrigerant by a coolant circulating in a separate coolant circuit. In this process, the chiller thermally couples the low-pressure region to the coolant circuit to transfer heat from the coolant circuit to the low-pressure region. Advantageously, heat can thus be transferred from the cooling circuit to the refrigerant circuit by means of the chiller.

In general, a chiller can be understood as a heat exchanger by means of which heat can be transferred from the coolant to the refrigerant of the refrigerant circuit.

According to a further advantageous development of the air conditioning system, the same comprises a (second) expansion device through which the refrigerant can flow, which is integrated into the refrigerant circuit in the first operating mode and forms a (second) transition between the high-pressure and low-pressure regions. The (second) expansion device can be an expansion valve. The (second) expansion device is separated from the refrigerant circuit in the second operating mode, so that refrigerant cannot flow through the second expansion device. Preferably, in the first operating mode, the (second) expansion device is arranged in the refrigerant circuit in the high-pressure region between the second internal heat exchanger and the evaporator. By means of the (second) expansion device, the refrigerant can be expanded in a particularly controlled manner before it flows into the evaporator.

Expediently, the (second) expansion device forms the changeover device or the changeover valve device of the changeover device. The (second) expansion device can be electrically actuated. The (second) expansion device acting as a changeover device or changeover valve device can comprise a valve body that is continuously adjustable between the closed position and the open position. This means that there is no need for a separate changeover valve device, which results in cost advantages and saves installation space.

In a further advantageous development of the air conditioning system, the first or/and second internal heat exchanger comprises a high-pressure path and a low-pressure path, by means of which the first or/and second internal heat exchanger couples or can couple the high thermal to the low-pressure region. Refrigerant can flow through the first or/and second internal heat exchanger via the high-pressure path and the low-pressure path in countercurrent without any material mixing of the portion of the refrigerant located in the high-pressure path with the portion of the refrigerant located in the low-pressure path. Such internal heat exchangers allow particularly low-loss heat transfer.

In a further preferred development of the air conditioning system, it is provided that the first or/and second internal heat exchanger comprises a coaxial line. In this case, in the coaxial line, the high-pressure path is present in a hollow shell of the coaxial line and the low-pressure path is present in a hollow core of the coaxial line or vice versa, wherein the hollow shell surrounds the hollow core, and the hollow shell and the hollow core are arranged coaxially with respect to each other.

The hollow shell may preferably completely surround the hollow core along a circumferential direction. The hollow shell and hollow core can be delimited by means of two hollow cylinders that overlap each other telescopically and are arranged coaxially. Particularly preferably, the high-pressure path is present in the hollow shell and the low-pressure path is present in the hollow core. Such internal heat exchangers are particularly compact.

Expediently, both the first and second internal heat exchangers each comprise a coaxial line. Here, in the coaxial line of the second internal heat exchanger, the high-pressure path is present in the hollow shell of this coaxial line and the low-pressure path is present in the hollow core of this coaxial line. In the coaxial line of the first internal heat exchanger, the high-pressure path is present in the hollow core of this coaxial line and the low-pressure path is present in the hollow shell of this coaxial line. Thus, heat loss in the two coaxial lines can be kept low.

Where appropriate, one of the two internal heat exchangers, may be a stacked disc heat exchanger, whereas the other of the internal heat exchangers comprises the coaxial line.

According to a further advantageous development of the air conditioning system, the external heat exchanger is arranged in the high-pressure region in the first operating mode. In the second operating mode, the external heat exchanger is located in the low-pressure region. Thus, in the first operating mode, the external heat exchanger can release heat from the refrigerant circuit to the outside air, and in the second operating mode, it can supply heat from the outside air to the refrigerant circuit.

In a further preferred development of the air conditioning system, the same comprises a (third) expansion device through which the refrigerant can flow, which is integrated into the refrigerant circuit in the second operating mode and forms a (third) transition between the high-pressure and low-pressure regions. In this case, the (third) expansion device is separated from the refrigerant circuit in the first operating mode. Preferably, in the refrigerant circuit, the (third) expansion device is arranged in the second operating mode in the high-pressure region between the first inner heat exchanger and the outer heat exchanger. Advantageously, the (third) expansion device enables the external heat exchanger to be operated in the second operating mode in the manner of an evaporator.

A further advantageous development of the air conditioning system provides that the air conditioning system has a intermediate refrigerant storage, which is arranged in the high-pressure region of the refrigerant circuit and through which the refrigerant can flow, for the intermediate storage of refrigerant. This intermediate refrigerant storage is used to storage refrigerant and, if necessary, can help dampen pressure waves in the refrigerant passing through the refrigerant circuit.

In another preferred development of the air conditioning system, the same comprises a differential pressure valve arranged between the intermediate refrigerant storage and the external heat exchanger in the first operating mode. Here, the intermediate refrigerant storage is arranged between the differential pressure valve and the first internal heat exchanger in the first operating mode. Refrigerant can only be flowed through the differential pressure valve when a pressure drop in the refrigerant applied to the differential pressure valve drops in the direction of the intermediate refrigerant storage. The differential pressure valve can be a check valve. The differential pressure valve can lock when a pressure drop in the refrigerant applied to the differential pressure valve is directed away from the intermediate refrigerant storage. As a result, the flow through the outer heat exchanger is in the opposite direction in the first operating mode compared to the second operating mode. The differential pressure valve offers a particularly simple technical solution for reversing the flow direction of the external heat exchanger.

A further advantageous development of the air conditioning system provides that the air conditioning system comprises a 3/2-way valve device arranged in the high-pressure region and through which the refrigerant can flow. Here, the 3/2-way valve device fluidically connects the condenser with the external heat exchanger in the first operating mode.

In contrast, in the second operating mode, the 3/2-way valve device fluidically connects the condenser to the intermediate refrigerant storage. By means of the 3/2-way valve device, the air conditioning system can be switched between its operating modes.

According to a further preferred development of the air conditioning system, the same comprises a valve device which, in the second operating mode, is arranged in the low-pressure region and through which refrigerant can flow. The valve device can be switchable between an open and a closed state. In this case, the valve device fluidically connects the outer heat exchanger with the first inner heat exchanger in the second operating mode. In contrast, the valve device is impermeable to the refrigerant in the first operating mode. Advantageously, the valve device can be used to move the external heat exchanger from the high-pressure region to the low-pressure region when switching between the operating modes of the air conditioning system, and vice versa.

In a further advantageous development of the air conditioning system, the same comprises a compressor arranged in the refrigerant circuit and through which the refrigerant can flow, which compressor forms a (fourth) transition between the high-pressure and low-pressure regions. Here, the compressor is arranged in the refrigerant circuit between the first internal heat exchanger in the low-pressure region and the condenser in the high-pressure region. The compressor advantageously allows the refrigerant to be driven through the refrigerant circuit, which allows heat transfer by means of the refrigerant. Thus, the heat absorbed into the refrigerant at a low temperature level can be raised to a higher temperature level by compression.

It is expedient that the evaporator, condenser and an electric heating device/electric heater are each lined up one behind the other at a distance from one another in an air conditioning air path of the air conditioning system, through which the air conditioning air can flow with respect to an air conditioning air path extension direction of the air conditioning air path. A blower may be present in the air conditioning air path to drive the air conditioning air through the air conditioning air path.

According to a further advantageous development of the air conditioning system, the same comprises a separate coolant circuit in which a coolant circulates. In this case, a coolant heat exchanger is arranged in the coolant circuit, which is present in an outside air path through which the outside air can flow and which thermally couples the outside air to the coolant circuit for heat transfer between the outside air and the coolant circuit. The outer heat exchanger is arranged in the outside air path at a distance from the coolant heat exchanger with respect to an outside air path extension direction of the outside air path. There may further be a blower in the outside air path to drive outside air through the outside air path. The coolant circuit can be used to control the temperature of other components of the motor vehicle, such as an electrical energy storage device, an electric drive and control/regulation electronics.

The invention relates to an air conditioning system for a motor vehicle with a refrigerant circuit divided into a high-pressure region and a low-pressure region; with two internal heat exchangers arranged in the high-pressure region and in the low-pressure region for transferring heat from the high-pressure region to the low-pressure region; with a heat exchanger arranged in the refrigerant circuit and through which refrigerant can flow for transferring heat between the refrigerant circuit and an outside air; with a condenser arranged in the high-pressure region and through which the refrigerant can flow for transferring heat from the high-pressure region to an air conditioning air; with an evaporator through which refrigerant can flow, which in a first operating mode thermally couples the low-pressure region to the air conditioning air and which in a second operating mode is arranged outside the refrigerant circuit.

Further important features and advantages of the invention are apparent from the dependent claims, from the drawings, and from the associated figure description based on the drawings.

It is understood that the features mentioned above and those to be explained below can be used not only in the combination indicated in each case, but also in other combinations or on their own, without leaving the scope of the present invention.

Preferred embodiments of the invention are shown in the drawings and will be explained in more detail in the following description, wherein identical reference signs refer to identical or similar or functionally identical components.

BRIEF DESCRIPTION OF THE DRAWINGS

Showing, each schematically

DETAILED DESCRIPTION

Figure 1:
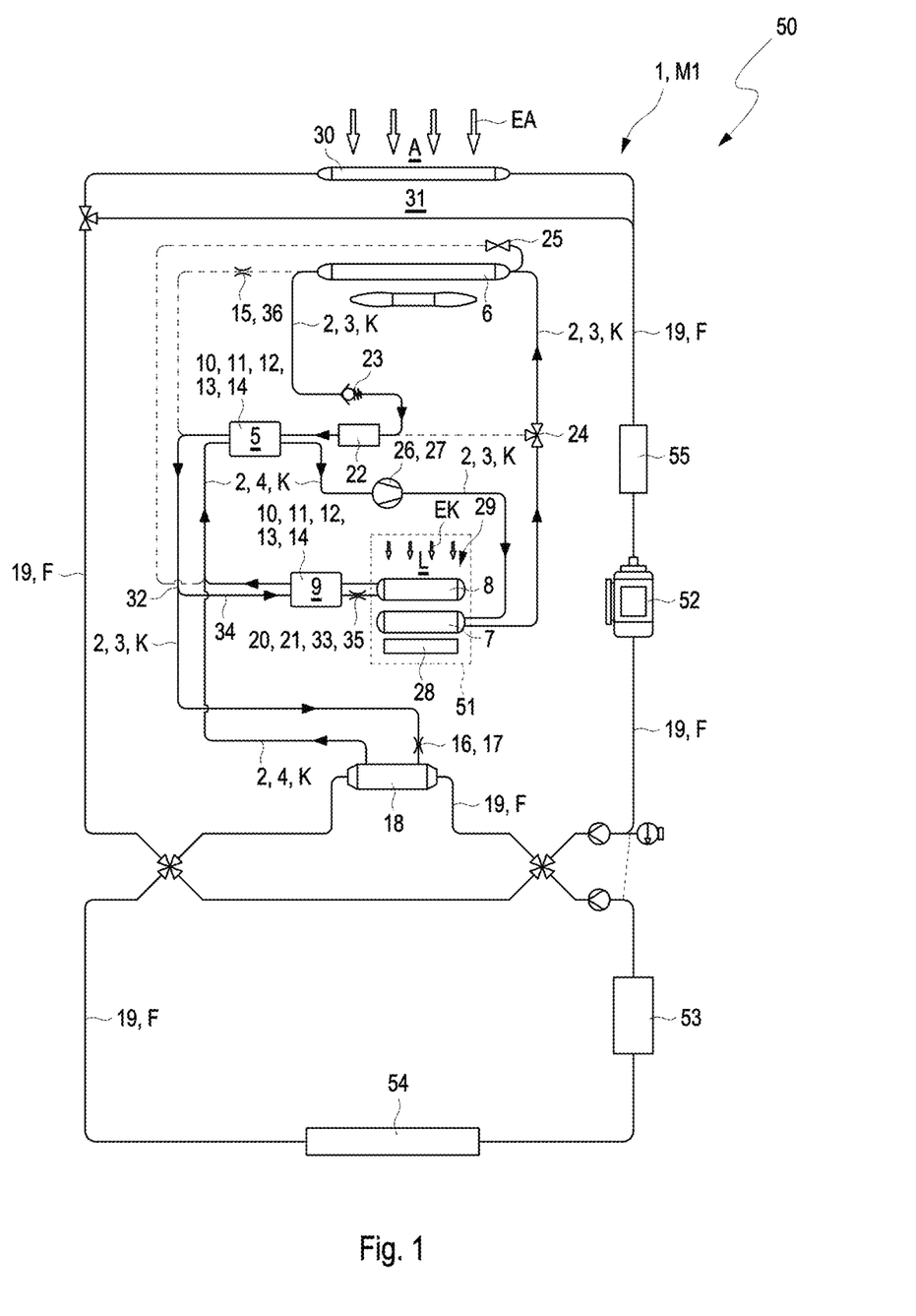
FIG. 1 an example in a circuit diagram form of an air conditioning system for a motor vehicle according to the invention, which is in a first operating mode, FIG. 2 the example of FIG. 2, wherein the air conditioning system is in a second mode of operation.

FIG. 1 shows, in the manner of a circuit diagram, an example of an air-conditioning system 1 for a motor vehicle 50 according to the invention. By means of the air conditioning system 1, a vehicle interior 51 of the motor vehicle 50 can be air conditioned. The motor vehicle 50 may be an at least partially electrified motor vehicle 50. An at least partially electrified motor vehicle 50 can comprise an electrical energy storage device 54 for storing electrical energy and an electrical drive 52 for moving the motor vehicle 50, which drive 52 can be supplied with electrical energy by means of the electrical energy storage device 54. The at least partially electrified motor vehicle 50 can be a fully electric motor vehicle 50 in which no other energy source is used in addition to electricity. Thereby, the vehicle interior 51 or an air conditioning air L that can be supplied to the vehicle interior 51 can be either heated or cooled during air conditioning by means of the air conditioning system 1. Accordingly, the air conditioning system 1 is operable in a first operating mode M1 and in a second operating mode M2 different from the first. The air conditioning system 1 can be switched between its first and its second operating mode M1, M2. The air conditioning system 1 is thus designed to be switchable between the two operating modes M1, M2. In the first operating mode M1, the air conditioning air L can be cooled by means of the air conditioning system 1, i.e. heat can be extracted from the air conditioning air L by means of the air conditioning system 1. In contrast, in the second operating mode M2, the air conditioning air L can be heated by means of the air conditioning system 1, i.e. heat can be supplied to the air conditioning system L by means of the air conditioning system 1. In FIG. 1, the air conditioning system 1 is in the first operating mode M1. Thus, the first operating mode M1 can be a chiller operation and the second operating mode M2 can be a heat pump operation.

In this regard, it can be seen from FIG. 1 that the air conditioning system 1 comprises a refrigerant circuit 2 in which a refrigerant K can circulate. The refrigerant K undergoes a cyclic phase transition from gaseous to liquid and back again in the refrigerant circuit 2, whereby the condensation and evaporation energy required for this can be utilized by means of the air conditioning system 1. The refrigerant circuit 2 is divided into a high-pressure region 3 and a low-pressure region 4. In the high-pressure region 3, the refrigerant K may be essentially liquid, whereas in the low-pressure region 4, the refrigerant K may be essentially gaseous. The air conditioning system 1 further comprises a first internal heat exchanger 5 through which the refrigerant K flows. The first internal heat exchanger 5 is arranged in both the high-pressure and low-pressure regions 3, 4, and this is independent of the operating condition, i.e. in both the first and second operating modes M1, M2. In the first internal heat exchanger 5, the high-pressure region 3 is thermally coupled to the low-pressure region 4 for transferring heat from the high-pressure region 3 to the low-pressure region 4.

Furthermore, the air conditioning system 1 according to FIG. 1 comprises an external heat exchanger 6, which is arranged in the refrigerant circuit 2 independently of the operating state and through which the refrigerant K can flow. The external heat exchanger 6 thermally couples the refrigerant circuit 2 to transfer heat between the refrigerant circuit 2 and an outside air A. In addition, the air conditioning system 1 has a condenser 7 arranged in the high-pressure region 3 of the refrigerant circuit 2, through which the refrigerant K can flow. In the condenser 7, at least part of the refrigerant K can undergo a phase transition from gaseous to liquid. The condenser 7 thermally couples the high-pressure region 3 to the air conditioning air L for transferring heat from the high-pressure region 3 to the air conditioning air L, which can be supplied to the vehicle interior 51 to be air-conditioned.

Figure 2:
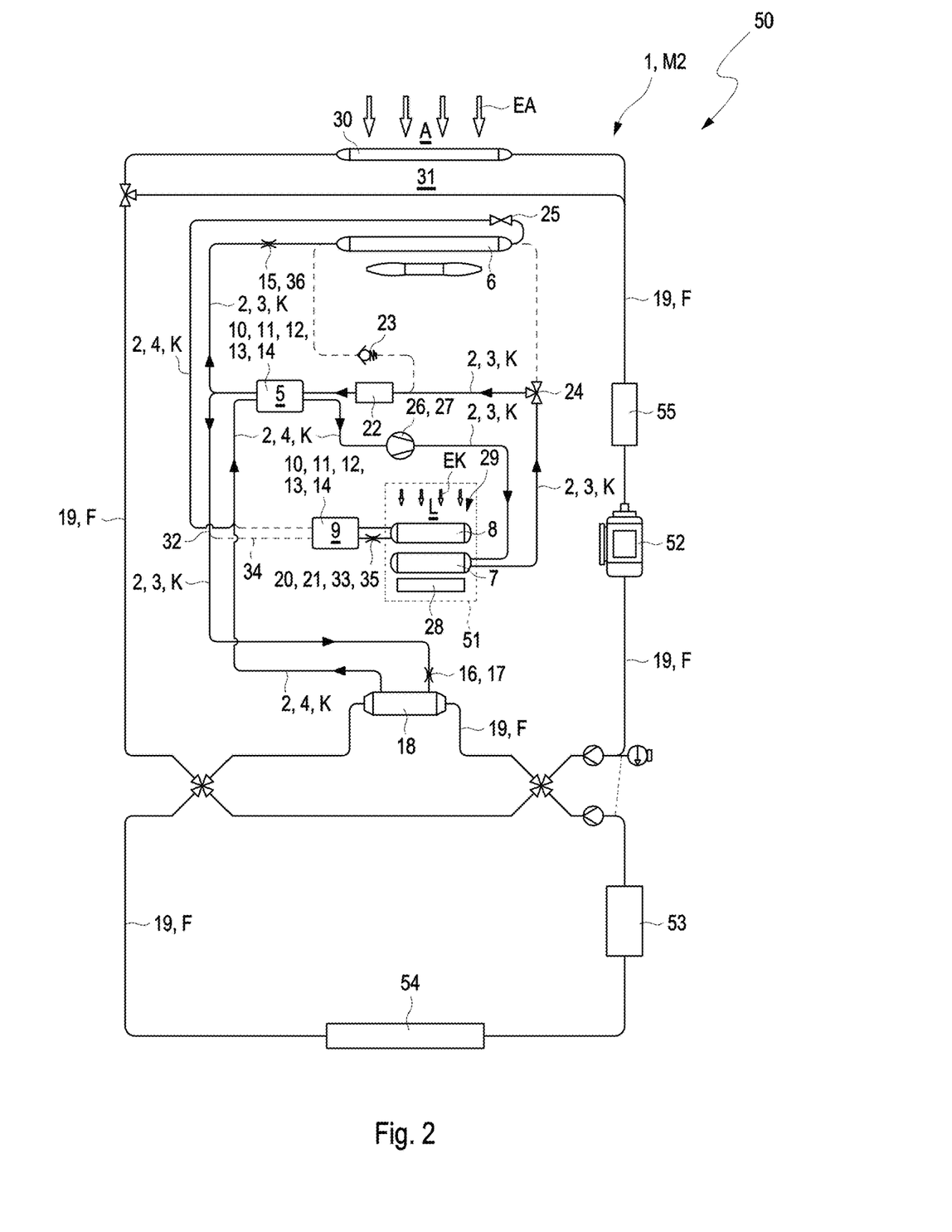

In FIG. 2, the air conditioning system 1 of FIG. 1 is shown—also in a schematic representation—in the second operating mode M2. In this regard, it can be seen from FIGS. 1 and 2 that the air conditioning system 1 comprises an evaporator 8 through which the refrigerant K can flow. The evaporator 8 can optionally be fluidically integrated into the refrigerant circuit 2 or separated from it. Here, in the first operating mode M1 of the air conditioning system 1, the evaporator 8 is integrated into the low-pressure region 4 of the refrigerant circuit 2, and in the second operating mode M2 it is separated from the refrigerant circuit 2.

It can thus be seen from FIGS. 1 and 2 that in the first operating mode M1 (shown in FIG. 1), the evaporator 8 is incorporated into the low-pressure region 4, thermally coupling the low-pressure region 4 to the air conditioning air L to transfer heat from the air conditioning air L to the low-pressure region 4. In this case, the refrigerant K can undergo a phase transition from liquid to gaseous as it flows through the evaporator 8 in the first operating mode M1. In contrast, in the second operating mode M2 (shown in FIG. 2) the evaporator 8 is separated from the refrigerant circuit 2, so that in the second operating mode M2, in contrast to the first operating mode M1, refrigerant K cannot flow through or through the evaporator 8.

It further follows from FIGS. 1 and 2 that the air conditioning system 1 comprises an adjustable changeover device 35 by means of which the evaporator 8 can be included in or separated from the refrigerant circuit 2 for switching between the first and second operating modes M1, M2. The evaporator 8 is arranged in an additional refrigerant line 34, which branches off from the refrigerant circuit 2 in a branch 32 upstream of the evaporator 8 and opens out again into the refrigerant circuit 2 downstream of the evaporator. The changeover device 35 comprises a changeover valve device 33, which is adjustable between a closed position and an open position and is arranged in the additional refrigerant line 34, so that no refrigerant K can flow through the evaporator 8 in the closed state. As an alternative to the example shown in FIGS. 1 and 2, the changeover valve device 33 can be arranged in the branch 32. The changeover valve device 33 is in the closed position in the second operating mode M2 of the air conditioning system 1.

According to the example of FIGS. 1 and 2, the air conditioning system 1 further comprises a second internal heat exchanger 9. The second internal heat exchanger 9 is incorporated in the first operating mode M1 for transferring heat from the high-pressure region 3 to the low-pressure region 4 in both the low-pressure and high-pressure regions 3, 4. Here, the second internal heat exchanger 9 thermally couples the high-pressure region 3 to the low-pressure region 4 in the first operating mode M1. In contrast to the first operating mode M1, the second internal heat exchanger 9 is separated from the refrigerant circuit 2 in the second operating mode M2. Whereas the second internal heat exchanger 9 can have refrigerant K flowed or flowing through it in the first operating mode M1, the second internal heat exchanger 9 cannot have refrigerant K flowed or flowing through it in the second operating mode M2. The first internal heat exchanger 5 is designed for the first operating mode M1 and the second internal heat exchanger 9 is designed for the second operating mode M2.

For example, the first as well as—alternatively or additionally—the second internal heat exchanger 5, 9 has a high-pressure path 10 and a low-pressure path 11, by means of which the respective internal heat exchanger 5, 9 couples or can couple the high thermal to the low-pressure region 3, 4. The first and—alternatively or additionally—the second heat exchanger 5, 9 comprise, for example, a coaxial line 12. In this coaxial line 12, the high-pressure path 10 may be present in a hollow shell 13 of the coaxial line 12, wherein the low-pressure path 11 is located in a hollow core 14 of the coaxial line 12, or vice versa. In the example scenario, in the second internal heat exchanger 9, the high-pressure path 10 is present in the hollow shell 13 and the low-pressure path 11 is present in the hollow core 14, whereas in the first internal heat exchanger 5, the assignment of high-pressure and low-pressure paths 10, 11 to hollow shell 13 and hollow core 14 is made in the reverse manner. In this case, the hollow shell 13 may surround the hollow core 14, wherein the hollow shell 13 and the hollow core 14 are arranged coaxially with respect to each other. However, this is not illustrated in detail in FIGS. 1 and 2 for clarity. If necessary, one of the internal heat exchangers 5, 9 can alternatively be implemented as a stacked disc heat exchanger, but this is not shown in FIGS. 1 and 2.

According to FIGS. 1 and 2, the air conditioning system 1 further comprises a first expansion device 16 arranged in the refrigerant circuit 2 and through which the refrigerant K flows, which may be an expansion valve. The first expansion device 16 forms a first transition 17 between high-pressure and low-pressure regions 3, 4. The first expansion device 16 can serve to throttle the refrigerant K flowing through the refrigerant circuit 2, so that a pressure drop in the refrigerant K can be established from upstream of the first expansion device 16 to downstream of the first expansion device 16. It can also be seen that the air conditioning system 1 comprises a chiller 18 through which the refrigerant K can flow, which is arranged in the low-pressure region 4 between the first internal heat exchanger 5 and the first expansion device 16.

The chiller 18 can be arranged in the low-pressure region 4 of the refrigerant circuit 1 regardless of the operating condition. The chiller 18 is fluidically separated from the refrigerant K by a coolant F circulating in a separate coolant circuit 19. For example, the coolant F does not undergo a phase transition when flowing through the coolant circuit 19. The chiller 18 can thus be arranged both in the refrigerant circuit 2 and in the coolant circuit 19. By means of the chiller 18, the low-pressure region 4 is thermally coupled to the coolant circuit 19 for transferring heat from the coolant circuit 19 to the low-pressure region 4. In general terms, a "chiller" 18 can be understood as a heat exchanger by means of which heat can be transferred from the coolant F to the refrigerant K of the refrigerant circuit 1.

FIGS. 1 and 2 further reveal that the air conditioning system 1 comprises a second expansion device 20 through which the refrigerant K flows and which is incorporated into the refrigerant circuit 2 in the first operating mode M1. The second expansion device 20 can be an expansion valve. Thereby, the second expansion direction 20 forms a second transition 21 between high-pressure and low-pressure regions 3, 4 in the first operating mode M1. The second expansion device 20 can serve to throttle the refrigerant K flowing through the refrigerant circuit 2 in the first operating mode M1, so that a pressure drop in the refrigerant K can be established from upstream of the second expansion device 20 to downstream of the second expansion device 20 in the first operating mode M1. In the second operating mode M2, the second expansion device 20 is arranged outside the refrigerant circuit 2. Thus, refrigerant K cannot flow through the second expansion device 20 in the second operating mode M2. For example, in the first operating mode M1, the second expansion device 20 is arranged in the refrigerant circuit 2 between the second internal heat exchanger 9 and the evaporator 8. In the example of FIGS. 1 and 2, the second expansion device 20 forms the changeover device 35 and the changeover valve device 33, respectively.

From FIGS. 1 and 2, it can be seen that in the first operating mode M1, the outer heat exchanger 6 is arranged in the high-pressure region 3, whereas in the second operating mode M2, the outer heat exchanger 6 is present in the low-pressure region 4. In this case, a flow direction along which refrigerant K can flow through the outer heat exchanger 6 can reverse from the first operating mode M1 to the second operating mode M2 and vice versa. The air conditioning system 1 has, for example, a third expansion device 15 through which the refrigerant K flows and which is integrated into the refrigerant circuit 2 in the second operating mode M2. Thereby, the third expansion device 15 forms a third transition 31 between high-pressure and low-pressure regions 3, 4 in the second operating mode M2. The third expansion device 15 can serve to throttle the refrigerant K flowing through the refrigerant circuit 2 in the second operating mode M2, so that a pressure drop in the refrigerant K can be established from upstream of the third expansion device 15 to downstream of the third expansion device 15 in the second operating mode M2. In the first operating mode M1, the third expansion device 15 is separated from the refrigerant circuit 2. In the first operating mode 1, therefore, refrigerant K cannot flow through the third expansion direction 15. For example, in the second operating mode M2 with respect to the refrigerant circuit 2, the third expansion device 15 is arranged between the first inner heat exchanger 5 and the outer heat exchanger 6.

Furthermore, FIGS. 1 and 2 show that the air conditioning system 1 has a intermediate refrigerant storage 22 arranged in the high-pressure region 3 of the refrigerant circuit 2 and through which the refrigerant K can flow, by means of which the refrigerant K can be temporarily stored. For example, the air conditioning system 1 includes a differential pressure valve 23, which may be implemented as a check valve. In the first operating mode M1, the differential pressure valve 23 is located in the high-pressure region 3 of the refrigerant circuit 2 between the intermediate refrigerant storage 22 and the external heat exchanger 6. Here, in the first operating mode M1, the intermediate refrigerant storage 22 is arranged in the high-pressure region 3 of the refrigerant circuit 2 between the differential pressure valve 23 and the first internal heat exchanger 5. Refrigerant K can flow through the differential pressure valve 23 only when a pressure drop in refrigerant K applied to the differential pressure valve 3 20 drops in the direction of the intermediate refrigerant storage 22. Accordingly, the differential pressure valve 23 can be flowed through by the refrigerant K in the first operating mode M1, whereas the differential pressure valve 23 is blocked in the second operating mode M2 and consequently cannot be flowed through by refrigerant K. This can be used to reverse the flow direction along which the flow passes through the outer heat exchanger 6 in the two operating modes M1, M2.

It is also apparent from FIGS. 1 and 2 that the air conditioning system 1 comprises a 3/2-way valve device 24 arranged in the high-pressure region 3 and through which the refrigerant K can flow. In the first operating mode M1, the 3/2-way valve device 24 fluidically connects the condenser 7 to the external heat exchanger 6. In the second operating mode M2, the 3/2-way valve device 24 fluidically connects the condenser 7 to the intermediate refrigerant storage 22. It can further be seen that the air conditioning system 1 comprises a valve device 25 switchable between an open and a closed state, which in the second operating mode M2 is arranged in the low-pressure region 4 and through which refrigerant K can flow. Thereby, the valve device 25 fluidically connects the outer heat exchanger 6 with the first inner heat exchanger 5 in the second operating mode M2. In contrast, the valve device 25 is impermeable to the refrigerant K, i.e. closed, in the first operating mode M1. The air conditioning system 1 also comprises a compressor 26 arranged in the refrigerant circuit 2 and through which the refrigerant K can flow. The compressor 26 may be used to drive the refrigerant K through the refrigerant circuit 2. The compressor 26 forms a fourth transition 27 between the high-pressure and low-pressure regions 3, 4 of the refrigerant circuit 2. The compressor 26 is located in the refrigerant circuit 2 between the first internal heat exchanger 5 in the low-pressure region 4 and the condenser 7 in the high-pressure region 3.

In this regard, the air conditioning system 1 according to the example of FIGS. 1 and 2 comprises an air conditioning air path 29 through which the air conditioning air L can flow and which extends along an air conditioning air path extension direction EK. The evaporator 8, the condenser 7 and an electric heating device 28 are lined up one behind the other and each at a distance from each other in the air conditioning air path 29 with respect to the air conditioning air path extension direction EK, along which air conditioning air path 29 the air conditioning air L can flow. The air conditioning air L can thus be passed in the air conditioning air path 29 successively through the evaporator 8, the condenser 7 and the electrical heating device 28—in this order or in an order deviating therefrom.

Furthermore, FIGS. 1 and 2 show that the air conditioning system 1 comprises a separate coolant circuit 19 in which a coolant F can or does circulate. The coolant F does not undergo a phase transition in the coolant circuit 19. A coolant heat exchanger 30 is arranged in the coolant circuit 19. The coolant heat exchanger 30 is provided in an outside air path 31 through which the outside air A flows. For heat transfer between the outside air A and the coolant circuit 19, the coolant heat exchanger 30 thermally couples the coolant circuit 19 to the outside air A. In this case, the external heat exchanger 6 is also arranged in the outside air path 31. The outside air path 31 extends along an outside air path extension direction EA, along which the outside air path 31 can also have the outside air A flowing through it. With respect to the outside air path extension direction EA, the outer heat exchanger 6 is located in the outside air path 31 at a distance from the coolant heat exchanger 30. In addition, a blower may be disposed in the outside air path 31 for driving the outside air A through the outside air path 31 along the outside air path extending direction EA. The electrical energy storage device 54 of the at least partially electrified motor vehicle 50 may be arranged in the coolant circuit 19. Furthermore, the electric drive 52 of the motor vehicle 50 may also be arranged in the coolant circuit 19. Control/regulation electronics 55 of the motor vehicle 50 may also be disposed in the coolant circuit 19. The coolant circuit 19 can be used to temper the components listed above. In addition, an electric coolant heater 53 may be provided in the coolant circuit 19, by means of which heat can be supplied to the coolant F. The coolant circuit 19 may include two loops, one of which includes the coolant heat exchanger 30 and the other of which includes the coolant heater 53. The two loops may overlap each other with two intersections, wherein each of the intersections has a valve device by means of which a distribution of coolant F to the loops may be varied. Thus, by suitably controlling the valve devices, the coolant circuit 19 allows the electric actuator 52, the control/regulation electronics 55, and the electrical energy storage device 54 to be selectively either heated or cooled. The coolant circuit 19 can therefore also function as a heating circuit.

In the air conditioning system 1 of FIGS. 1 and 2, the two internal heat exchangers 5, 9 can be designed and integrated into the circuitry of the refrigeration circuit 2 in such a way that no special valves and lines are required for this purpose compared to conventional air conditioning systems. For this purpose, the first internal heat exchanger 5 can be integrated in such a way that, during operation of the air conditioning system 1, it is always flowed through by the entire mass flow of refrigerant K circulating in the refrigerant circuit 2 on its high-pressure side and on its low-pressure side, both in the refrigerating machine mode and in the heat pump mode—i.e. in both operating modes M1, M2. The high-pressure side may be present in the high-pressure path 10 and the low-pressure side may be present in the low-pressure path 11. In this context, a design of the first internal heat exchanger 5 can essentially be based on the operating conditions relevant for heat pump operation, i.e. the second operating mode M2. Such an operating condition of particular relevance to the second operating mode M2 may be a high temperature difference at a low refrigerant mass flow rate.

According to FIGS. 1 and 2, the first internal heat exchanger 5 may be integrated in such a way that, during operation of the air conditioning system 1, it is located in the high-pressure region 3 downstream of the intermediate refrigerant storage 22 and upstream of the components located for heat absorption in the refrigerant circuit 2—i.e. evaporator 8, chiller 18 and external heat exchanger 6. With respect to the low-pressure region 4, the first internal heat exchanger 5 may be located downstream of these components located for heat absorption in the refrigerant circuit 2 in a line section that may be present in a flow direction illustrated by arrows in FIGS. 1 and 2, along which the refrigerant K flows through the refrigerant circuit 2 during operation of the air conditioning system 1, downstream of a final refrigerant return line from said components. Consequently, the entire refrigerant mass flow leading to the compressor 26 can flow through the first internal heat exchanger 5.

In order to further increase the efficiency of the refrigerant circuit 2 in the chiller mode—i.e. the first operating mode M1 illustrated in FIG. 1—at low temperature differences between the high-pressure region 3 and the low-pressure region 4 and at larger refrigerant mass flows, the second internal heat exchanger 9 can be used. Only the mass flow of refrigerant K flowing to the evaporator 8 can pass through the second internal heat exchanger 9. Thus, the second internal heat exchanger 9 can only be effective when the evaporator 8 is operating. A corresponding shutdown device for deactivating the second internal heat exchanger 9 can be realized in an advantageous manner by means of the second expansion device 20, which must be present anyway so that refrigerant K does not flow through the evaporator 8 during heat pump operation—i.e. in the second operating mode M2. Thus, in the air conditioning system 1 of FIGS. 1 and 2, in both operating modes M1, M2, a total mass flow of refrigerant K passed through the refrigerant circuit 2 can be used for conditioning the air conditioning air L.

FIG. 1 also shows that in the first operating mode M1 the refrigerant K can initially flow through the condenser 7 starting from the compressor 26 and without giving off heat there, since in this operating mode the condenser 7 does not have air conditioning air L flowing through it and can therefore be passive in terms of heat transfer. Instead, the refrigerant K can dissipate the heat generated during its condensation via the external heat exchanger 6 to the outside air A, which can be discharged to an external environment of the air conditioning system 1 or the motor vehicle 50, before flowing into the intermediate refrigerant storage 22. Subsequently, refrigerant K may enter the high-pressure path 10 of the first internal heat exchanger 5 where heat transfer may occur to the refrigerant K flowing back through the low-pressure path 11 to the compressor 26. After leaving the high-pressure path 10 of the first internal heat exchanger 5, the refrigerant K can flow to the chiller 18 or/and the evaporator 8 in order to absorb heat from the coolant F or/and from the air conditioning air L after an expansion process. The mass flow of refrigerant K directed to the evaporator 8 can flow through the second internal heat exchanger 9 for heat transfer from the warm refrigerant K in the high-pressure path 10 of the second internal heat exchanger 9 to the cold refrigerant K in the low-pressure path 11 of the second internal heat exchanger 9. After leaving the low-pressure path 11 of the second internal heat exchanger 9, the refrigerant K can be recombined with the refrigerant K coming from the chiller 18 to form a total mass flow of refrigerant K, which is then passed through the first internal heat exchanger 5 and, after heat absorption there, returns to the compressor 26.

Although not shown in FIGS. 1 and 2, the air conditioning system 1 can also be operated in an evaporator-only cooling mode in which the chiller 18 is inoperative. To take the chiller 18 out of operation, a flow of coolant F through the chiller 18 can be stopped by means of the valve devices of the coolant circuit 19. Alternatively, the coolant F may passively flow through the chiller 18 without heat transfer when the chiller 18 is inoperative. In addition, the flow of refrigerant K through the chiller 18 can be stopped. For this purpose, analogous to the evaporator 8, either a closable expansion valve or a switching valve can be used in the chiller feed line. In evaporator cooling mode only, the complete refrigerant mass flow can be passed through both the first internal heat exchanger 5 and the second internal heat exchanger 9, corresponding to a direct series connection of the two internal heat exchangers 5, 9.

According to FIG. 2, in the second operating mode M2—i.e. in heat pump operation—after compression of the refrigerant K in the compressor 26, the refrigerant K can be directed to the condenser 7, through which the air conditioning air L can flow in the second operating mode M2. Thus, in the second operating mode M2, condensation of the refrigerant K can occur in the condenser 7 and, as a result, heat transfer of at least part of the condensation heat of the refrigerant K to the air conditioning air L can occur. Subsequently, the refrigerant K can pass to the intermediate refrigerant storage 22 and flow into the high-pressure path 10 of the first heat exchanger 5. After leaving the high-pressure path 10 of the first inner heat exchanger 5, the total mass flow of refrigerant K can be split and directed to the outer heat exchanger 6 for absorbing heat from the environment or from the outside air A or/and to the chiller 18 for absorbing heat from the coolant F. The evaporator 8 cannot be operated in heat pump mode, i.e. in the second operating mode M2, which means that the second internal heat exchanger 9 can automatically be taken out of operation. After expansion of the refrigerant K and heat absorption by the refrigerant K in the outer heat exchanger 6 or/and in the chiller 18, the previously divided refrigerant mass flows can combine again to form the total mass flow of refrigerant K and reach the low-pressure path 11 of the first inner heat exchanger 5. In the low-pressure path 11 of the first internal heat exchanger 5, the refrigerant K can absorb heat from the high-pressure path 10 of the first internal heat exchanger 5 before the refrigerant K can return to the compressor 26.

The invention claimed is:

1. An air conditioning system for a motor vehicle, comprising:
   a refrigerant circuit for circulating a refrigerant and divided into a high-pressure region and a low-pressure region,
   a first internal heat exchanger arranged in the high-pressure region and the low-pressure region and through which the refrigerant is flowable, the first internal heat exchanger thermally coupling the high-pressure region to the low-pressure region to transfer heat from the high-pressure region to the low-pressure region,
   a second internal heat exchanger that is integrated in the low-pressure region and in the high-pressure region in a first operating mode of the air conditioning system for transferring heat from the high-pressure region to the low-pressure region and that thermally couples the high-pressure region to the low-pressure region,
   an external heat exchanger arranged in the refrigerant circuit and through which the refrigerant is flowable, wherein the external heat exchanger thermally couples the refrigerant circuit to outside air to transfer heat between the refrigerant circuit and the outside air,
   a condenser arranged in the high-pressure region and through which the refrigerant is flowable, wherein the condenser thermally couples the high-pressure region to air conditioning air to transfer heat from the high-pressure region to the air conditioning air that is suppliable to a vehicle interior to be air-conditioned,
   an evaporator through which refrigerant is flowable and that is selectively incorporated into or separated from the refrigerant circuit, wherein the evaporator is incorporated into the low-pressure region of the refrigerant circuit in the first operating mode of the air conditioning system and is separated from the refrigerant circuit in a second operating mode of the air conditioning system, and
   wherein the second internal heat exchanger is separated from the refrigerant circuit in the second operating mode.

2. The air conditioning system according to claim 1, further comprising an adjustable changeover device via which the evaporator is connected to or disconnected from the refrigerant circuit for switching between the first operating mode and the second operating mode.

3. The air conditioning system according to claim 1, wherein the first internal heat exchanger is structured for the first operating mode and the second internal heat exchanger is structured for the second operating mode.

4. The air conditioning system according to claim 1, wherein the evaporator is arranged in an additional refrigerant line that branches off from the refrigerant circuit in a branch upstream of the evaporator and opens out again into the refrigerant circuit downstream of the evaporator.

5. The air conditioning system according to claim 4, further comprising:
   a changeover device structured and arranged to connect and disconnect the evaporator from the refrigerant circuit for switching between the first operating mode and the second operating mode, wherein the changeover device comprises a changeover valve device that is adjustable between a closed position and an open position and is arranged in the branch or in the additional refrigerant line, to block a flow of refrigerant through the evaporator in the closed position; and
   wherein the changeover valve device is in the closed position in the second operating mode.

6. The air conditioning system according to claim 1, further comprising:
   an expansion device arranged in the refrigerant circuit and through which the refrigerant is flowable, the expansion device defining a transition between the high-pressure region and the low-pressure region,
   a chiller through which the refrigerant is flowable and arranged in the low-pressure region between the first internal heat exchanger and the expansion device,
   wherein the chiller is fluidically separated from the refrigerant by a coolant circulating in a separate coolant circuit, and
   wherein the chiller thermally couples the low-pressure region to the coolant circuit for transferring heat from the coolant circuit to the low-pressure region.

7. The air conditioning system according to claim 1, further comprising:
   an expansion device through which the refrigerant is flowable and which, in the first operating mode, is integrated in the refrigerant circuit and forms a transition between the high-pressure region and the low-pressure region,
   the expansion device is separated from the refrigerant circuit in the second operating mode, so that refrigerant cannot flow through the expansion device in the second operating mode, and
   in the first operating mode, the expansion device is arranged in the refrigerant circuit between the second internal heat exchanger and the evaporator.

8. The air conditioning system according to claim 7, wherein the expansion device provides a changeover device that connects and disconnects the evaporator from the refrigerant circuit for switching between the first operating mode and the second operating mode.

9. The air conditioning system according to claim 1, wherein at least one of the first internal heat exchanger and the second internal heat exchanger includes a high-pressure path and a low-pressure path via which the at least one of the first internal heat exchanger and the second internal heat exchanger thermally couples the high-pressure region to the low-pressure region.

10. The air conditioning system according to claim 9, wherein:
the at least one of the first internal heat exchanger and the second internal heat exchanger further includes a coaxial line, and
in the coaxial line, the high-pressure path is provided in a hollow shell of the coaxial line and the low-pressure path is provided in a hollow core of the coaxial line, or vice versa, and wherein the hollow shell surrounds the hollow core and the hollow shell and the hollow core are arranged coaxially with respect to one another.

11. The air conditioning system according to claim 10, wherein:
both the first internal heat exchanger and the second internal heat exchanger each include the coaxial line,
in the coaxial line of the second internal heat exchanger, the high-pressure path is provided in the hollow shell of this coaxial line and the low-pressure path is provided in the hollow core of this coaxial line, and
in the coaxial line of the first internal heat exchanger, the high-pressure path is provided in the hollow core of this coaxial line and the low-pressure path is provided in the hollow shell of this coaxial line.

12. The air conditioning system according to claim 1, wherein:
the external heat exchanger is arranged in the high-pressure region in the first operating mode, and
the external heat exchanger is arranged in the low-pressure region in the second operating mode.

13. The air conditioning system according to claim 12, further comprising:
an expansion device through which the refrigerant is flowable and integrated into the refrigerant circuit in the second operating mode and forms a transition between the high-pressure region and the low-pressure region,
wherein the expansion device is separated from the refrigerant circuit in the first operating mode, and
in the refrigerant circuit, the expansion device is arranged in the second operating mode between the first internal heat exchanger and the external heat exchanger.

14. The air conditioning system according to claim 1, further comprising an intermediate refrigerant storage arranged in the high-pressure region of the refrigerant circuit and through which the refrigerant is flowable for an intermediate storage of refrigerant.

15. The air conditioning system according to claim 14, further comprising:
a differential pressure valve which, in the first operating mode, is arranged between the refrigerant intermediate storage and the external heat exchanger,
wherein the intermediate refrigerant storage is arranged between the differential pressure valve and the first internal heat exchanger in the first operating mode, and
the differential pressure valve is only flowed through by refrigerant when a pressure drop in the refrigerant applied to the differential pressure valve drops in a direction of the intermediate refrigerant storage.

16. The air conditioning system according to claim 14, further comprising:
a 3/2-way valve device arranged in the high-pressure region and through which the refrigerant is flowable,
the 3/2-way valve device fluidically connects the condenser to the external heat exchanger in the first operating mode, and
the 3/2-way valve device fluidically connects the condenser to the intermediate refrigerant storage in the second operating mode.

17. The air conditioning system according to claim 1, further comprising:
a valve device which, in the second operating mode, is arranged in the low-pressure region and through which refrigerant is flowable,
wherein the valve device fluidically connects the external heat exchanger to the first internal heat exchanger in the second operating mode, and
wherein the valve device is impermeable to the refrigerant in the first operating mode.

18. The air conditioning system according to claim 1, further comprising:
a compressor arranged in the refrigerant circuit and through which the refrigerant is flowable and forms a transition between the high-pressure region and the low-pressure region, and
wherein the compressor is arranged in the refrigerant circuit between the first internal heat exchanger and the condenser.

19. The air conditioning system according to claim 1, wherein the evaporator, the condenser, and an electric heater are each lined up one behind the other at a distance from one another in an air conditioning air path, through which the air conditioning air is flowable, with respect to an air conditioning air path extension direction of the air conditioning air path.

20. The air conditioning system according to claim 1, further comprising:
a separate coolant circuit in which a coolant circulates,
a coolant heat exchanger arranged in the coolant circuit, which is present in an outside air path through which the outside air flows, and which thermally couples the outside air to the coolant circuit for heat transfer between the outside air and the coolant circuit, and
wherein the external heat exchanger is arranged in the outside air path at a distance from the coolant heat exchanger with respect to an outside air path extension direction of the outside air path.

* * * * *